(12) United States Patent
Srinivasan

(10) Patent No.: US 10,337,499 B1
(45) Date of Patent: Jul. 2, 2019

(54) SELF-INSTALLING COLUMN STABILIZED OFFSHORE WIND TURBINE SYSTEM AND METHOD OF INSTALLATION

(71) Applicant: Nagan Srinivasan, Missouri City, TX (US)

(72) Inventor: Nagan Srinivasan, Missouri City, TX (US)

( * ) Notice: Subject to any disclaimer, the term of this patent is extended or adjusted under 35 U.S.C. 154(b) by 0 days.

(21) Appl. No.: 15/960,484

(22) Filed: Apr. 23, 2018

Related U.S. Application Data

(62) Division of application No. 14/283,145, filed on May 20, 2014, now Pat. No. 10,087,915.

(51) Int. Cl.
| | |
|---|---|
| *F03D 13/10* | (2016.01) |
| *F03D 13/20* | (2016.01) |
| *E04H 12/18* | (2006.01) |
| *E04H 12/34* | (2006.01) |
| *F03D 9/00* | (2016.01) |
| *F03D 13/25* | (2016.01) |

(52) U.S. Cl.
CPC ........... *F03D 13/10* (2016.05); *E04H 12/187* (2013.01); *E04H 12/345* (2013.01); *F03D 9/00* (2013.01); *F03D 13/20* (2016.05); *F03D 13/25* (2016.05)

(58) Field of Classification Search
CPC ... E04H 12/187; E04H 12/345; F03D 11/045; F03D 11/065; F03D 9/00; F03D 13/20; F03D 13/10; F03D 13/25

USPC ........................................................ 416/85
See application file for complete search history.

(56) References Cited

U.S. PATENT DOCUMENTS

| | | | |
|---|---|---|---|
| 5,761,124 | A | 6/1998 | Sato et al. |
| 6,942,427 | B1 | 9/2005 | Srinivasan |
| 7,086,809 | B2 | 8/2006 | Busso |
| 7,281,881 | B1 | 10/2007 | Cermelli et al. |
| 8,471,396 | B2 | 6/2013 | Roddier et al. |
| 8,692,401 | B2 | 4/2014 | Roddier et al. |
| 2010/0140949 | A1 | 6/2010 | Pitre et al. |
| 2010/0316450 | A1 | 12/2010 | Botwright |
| 2011/0074155 | A1 | 3/2011 | Scholte-Wassink |
| 2012/0000071 | A1 | 1/2012 | Harris |
| 2012/0118215 | A1 | 5/2012 | Tosello |
| 2012/0304911 | A1 | 12/2012 | McCoy |

*Primary Examiner* — Kevin F Murphy
*Assistant Examiner* — Kelsey E Cary
(74) *Attorney, Agent, or Firm* — Kenneth A. Roddy

(57) ABSTRACT

A self-installing offshore column stabilized semi-submersible platform has at least one vertical buoyant ballastable column, a telescoping keel tank or stiffened damper plate movably connected with the vertical column that extends and retracts relative to a lower end thereof, and a tilt and telescoping wind turbine tower assembly pivotally coupled to an upper end of the vertical column telescopes and reciprocates relative thereto between a horizontal retracted position and an axially extended vertical position. A wind turbine with blades is coupled to a top portion of the upper section of the tower assembly. The relative position and weight of the keel tank or damper plate is selectively adjustable to raise or lower the center of gravity of the entire mass of the semi-submersible platform including the wind turbine and tower assembly with respect to the center of buoyancy of the platform.

6 Claims, 12 Drawing Sheets

SELF-INSTALLING COLUMN STABILIZED OFFSHORE WIND TURBINE SYSTEM AND METHOD OF INSTALLATION

CROSS REFERENCE TO RELATED APPLICATIONS

This application is a divisional of and claims priority of U.S. patent application Ser. No. 14/283,145, filed May 20, 2014, which is incorporated herein in its entirety.

BACKGROUND OF THE INVENTION

1. Field of the Invention

This invention relates generally to offshore wind turbines and methods of installation thereof and, more particularly, to a self-installing wind turbine system having a column stabilized semi-submersible platform with a telescoping keel tank or telescoping motion dampers and a tilt and telescoping wind turbine tower assembly, and method of installation thereof independent of cranes and derricks.

2. Background Art

Offshore wind energy is increasing in popularity. Most wind power farm development is in shallow water. In deep water, more distant from the shore, the wind resources are far superior to the near shore shallow water locations. Fixed wind supporting structures are not cost effective in deepwater locations. To harness these deepwater wind resources, wind turbines are mounted onto floating platforms. The industry typically modifies and downsizes conventional floating vessel technology developed for oil and gas deepwater platforms.

Fixed wind supporting structures are not cost effective in the deepwater environment. SPAR type floating structures require large installation cost. Conventional column stabilized semi-submersible platforms are not suitable because of the requirement of large pontoons. Tension leg platforms have several drawbacks which low vertical natural frequencies in the neighborhood of the service wave excitation, installation of the tendons, and onsite installation of the wind turbines, and the coupling behavior between the turbines and the tendons to the environmental and operational loads are significant.

My previous U.S. Pat. No. 6,761,124, which is hereby incorporated by reference herein in its entirety, discloses column-stabilized floating structures having a deck and a plurality of vertical buoyant caissons bridged together in distantly spaced relation by a plurality of open frame horizontal truss pontoon members and vertical truss columns at a lower end. The buoyancy of the caissons is selectively adjusted by means of ballast control such that the water mass and weight is adjustably tuned to raise or lower the center of gravity of the entire mass of the floating structure relative to its center of buoyancy.

My previous U.S. Pat. No. 6,942,427, which is hereby incorporated by reference herein in its entirety, discloses a floating offshore fluid storage platform having at least one vertically oriented buoyant caisson having an enclosed fluid storage chamber, at least one keel tank movably connected with the caisson for extensible and retractable movement relative to a lower end thereof, and pump means for selectively pumping water in and out of the keel tank to adjust the weight and ballast thereof such that the relative position and weight of the keel tank is adjustably tuned to raise or lower the center of gravity of the entire mass of the structure with respect to its center of buoyancy.

Busso, U.S. Pat. No. 7,086,809, and Cermelli et al, U.S. Pat. No. 7,281,881, disclose minimum floating offshore platforms with water entrapment plates for use in offshore oil or gas production in which a plurality of vertical stabilizing columns are each supported on a submerged horizontal water entrapment plate. The platform is maintained in a desired location by a plurality of mooring lines anchored to the sea-bed. The respective size and shape of the columns and water entrapment plate are designed to provide sufficient buoyancy to carry the weight of all equipment on the minimum floating platform and mooring lines, umbilical and risers attached to it, and to minimize the platform motion during normal operations. The water entrapment plates are fixed and are not extensible or retractable relative to the columns.

Roddier et al, U.S. Pat. No. 8,471,809, discloses a column-stabilized offshore platform with water-entrapment plates and asymmetric mooring system for supporting offshore wind turbines. The platform includes a floatation frame that includes at least three columns that are coupled to each other with horizontal main beams. A wind turbine tower is mounted above a tower support column. The turbine's gearbox generator and other electrical gear can be mounted either traditionally in the nacelle, or lower in the tower or in the top of the tower-supporting column. The floatation frame includes a water ballasting system that pumps water between the columns to keep the tower in a vertical alignment regardless of the wind speed. Water-entrapment plates are mounted to the bottoms of the columns to minimize the rotational movement of the floatation frame due to waves. The wind turbine tower is not movable between a horizontal and vertical position nor extensible and retractable, and the water entrapment plates are fixed and are not extensible or retractable relative to the columns.

Roddier et al, U.S. Pat. No. 8,692,401, is a continuation of the '809 patent and discloses an asymmetric mooring system for supporting a semi-submersible wind turbine platform having the features as described in the '809 patent. The wind turbine tower is not movable between a horizontal and vertical position nor extensible and retractable, and the water entrapment plates are fixed and are not extensible or retractable relative to the columns.

Botwright, U.S. Patent Publication 2010/0316450, discloses a method for installing an offshore wind turbine comprising the steps of preparing an offshore foundation for receiving and retaining a part of the wind turbine, moving the wind turbine in substantially vertical (erected) position from an onshore position to a transit position on a barge system, transporting the barge system to the site of the offshore foundation, moving the wind turbine from the transit position to an installation position on the barge system, positioning the part of the wind turbine in relation to the foundation, and lowering the barge system in relation to the water level so that the part of the wind turbine engages with the prepared offshore foundation.

Schlote-Wassink, U.S. Patent Publication 2011/0074155, discloses a floating offshore wind turbine and a floating offshore wind farm with at least one floating offshore wind turbine. The floating offshore wind turbine includes a floating platform anchored to an underwater ground, a wind turbine mounted on the floating platform, and a drive that is adapted to horizontally move the floating platform.

Harris, U.S. Patent Publication 2012/0000071, discloses an offshore wind turbine installation system and method independent of cranes and derricks. The components are stored in an offshore structure, such as a SPAR. After transporting the offshore structure horizontally to a site, the structure can be uprighted to a vertical orientation. A variable ballast component coupled to a tower of the wind turbine assembly can reciprocally retract the tower into the offshore structure to lower the tower, and extend the tower away from the offshore structure to raise the tower until the full quantity of blades are assembled to a turbine coupled to the tower. When the blades are stored in a peripheral fashion around the tower, the method and system provides for automatic rotational indexing of the tower as the tower and turbine retract and extend, so the turbine is progressively aligned with each blade to be installed.

Tosello, U.S. Patent Publication 2012/0118215, discloses a catamaran-type boat suitable for handling, assembling, and/or transporting off-shore wind turbines, the boat having two side floats constituting a U-shaped floating structure, the open space between the two branches of the U-shape constituted by the two side floats being suitable for receiving a base, the floats being fitted with grippers suitable for gripping the base between the two side floats, and the grippers being suitable for gripping the base and at least two grip levels of different heights.

McCoy, U.S. Patent Publication 2012/0304911, discloses a dynamic anchoring system for use in stabilizing a floating platform. The dynamic anchoring system includes a mooring assembly having a plurality of rodes each with an adjustable length. As waves cause the platform to rock, the length of each rode is adjusted in a manner to counteract the motion created by the waves. Thus, the platform remains substantially level. The platform supports a wind turbine on a mast. At least one motion sensor on the mast provides motion data indication the direction and speed of the hull's motion.

SUMMARY OF THE INVENTION

The present invention is distinguished over the prior art in general, and these patents in particular, by a self-installing offshore floating wind turbine system which includes a column stabilized semi-submersible platform having at least one vertical buoyant ballastable column with one or more buoyant tanks or interior chambers enclosed by bulkheads including ballast control means for selectively adjusting the buoyancy thereof. A telescoping keel tank movably connected with the vertical column by an elongate spindle slidably and telescopically mounted within the vertical column for extensible and retractable movement relative to a lower end thereof. The keel tank includes ballast control means for selectively adjusting the ballast and weight thereof. A tilt and telescoping wind turbine tower assembly has a lower section pivotally coupled to an upper end of the vertical column, and an upper section movably mounted in the lower section to telescope and reciprocate relative thereto between a retracted position and an axially extend position relative thereto. Pivot means, such as hydraulic cylinders, are operably connected between the vertical column and the telescoping tower assembly to pivot the tower assembly between a generally horizontal stored or transport position, and a generally vertical operating position. The upper section of the tower assembly can be extended and retracted relative to the lower section. A wind turbine is coupled to a top portion of the upper section of the tower assembly, and a plurality of blades is coupled to the wind turbine. The wind turbine has a generally horizontal axis of rotation about which the blades rotate.

The relative position and weight of the keel tank is selectively adjustable to raise or lower the center of gravity of the entire mass of the semi-submersible platform including the wind turbine and tilt and telescoping tower assembly with respect to the center of buoyancy of the platform according to ballast and variable or fixed loads including loads imposed by the wind turbine and tilt and telescoping tower assembly in the horizontal and the generally vertical operating positions. The keel tank, in an extended position, also provides water entrapment surfaces to increase hydrodynamic mass and flow damping to reduce heave, pitch and roll motions of the platform in an operational mode.

A plurality of the column stabilized semi-submersible platforms may be joined together by a plurality of open-frame truss structures formed of slender tubular members connected between adjacently spaced vertical columns to form a wind farm.

In a tri-column embodiment with individual keel tanks, three of the vertical columns are together by a plurality of open-frame truss structures formed of slender tubular members connected between adjacently spaced said vertically oriented columns to form a generally triangular platform configuration. Respective vertical columns each have a telescoping keel tank movably connected therewith by the elongate spindle, and the tilt and telescoping wind turbine tower assembly lower section is pivotally coupled to an upper end of one of the vertical columns. The relative position and weight of each keel tank is selectively adjustable to raise or lower the center of gravity of the entire mass of the platform including the wind turbine and tilt and telescoping tower assembly with respect to the center of buoyancy of the platform according to ballast and variable or fixed loads including loads imposed by the wind turbine and tilt and telescoping tower assembly in the horizontal and the generally vertical operating positions, and each keel tank, in an extended position, provides water entrapment surfaces to increase hydrodynamic mass and flow damping to reduce heave, pitch and roll motions of the platform in an operational mode.

In a tri-column embodiment with a single large keel tank, the telescoping keel tank is a single large keel tank connected at a lower end of each the elongate spindles by a swivel connection near the outer periphery thereof. The keel tank contains interior buoyant tanks or chambers enclosed by bulkheads and includes ballast control means for selectively adjusting the ballast and weight thereof so as to allow the single telescoping keel tank to pivot relative to a horizontal plane when various ones of the spindles are extended or retracted. The relative position and weight of the single large keel tank is selectively adjustable to raise or lower the center of gravity of the entire mass of the platform including the wind turbine and tilt and telescoping tower assembly with respect to the center of buoyancy of the platform according to ballast and variable or fixed loads including loads imposed by the wind turbine and tilt and telescoping tower assembly in the horizontal and the generally vertical operating positions. The relative position and weight of the single large keel tank is also selectively adjustable to raise or lower front, rear, or side portions, of the keel tank on sides or ends opposite to the one column supporting the wind turbine, to provide the platform with an even keel condition, and to counteract listing and moment forces created by offset wind turbine loads with respect to the center of the platform. The single large keel tank, in an extended position, also provides water entrapment surfaces to increase hydrodynamic mass and flow damping to reduce heave, pitch and roll motions of the platform in an operational mode.

In other embodiments of the single column and tri-column platforms, the keel tank is replaced by a retractable stiffened damper plate attached to the bottom of the telescoping spindle that is mounted in the vertical column.

One of the significant features and advantages of the present invention is that the submersible platforms can fully assembled in their compact mode and the wind turbine may be mounted on the platform in a sheltered area near the quayside and the whole structure can be towed to a windfarm located in the offshore deepwater by a tug boat that has anchor handling capability rather than expensive cranes or derricks mounted on offshore construction vessels, thereby significantly reducing the installation cost and time to develop wind farms.

Another feature and advantage of the present column stabilized semi-submersible platforms is that the telescoping keel tank or stiffened damper plate in the fully extended position during operation provides required stability to the horizontal and vertical wind turbine loads.

Another feature and advantage of the present column stabilized semi-submersible platforms is that the telescoping keel tank or damper plate in the fully extended position is distanced beneath the severe kinematics of wave particle motion, thereby significantly reducing wave excitation imparted to the supporting floating structure.

Another feature and advantage of the present column stabilized semi-submersible platforms is that the telescoping keel tank or damper plate provides water entrapment above and below the flat surfaces thereof, thereby increasing the hydrodynamic mass and flow damping to reduce the heave, pitch and roll motion of the supporting floating structure in the operational mode.

A further feature and advantage of the present column stabilized semi-submersible platforms is that the telescoping keel tank or damping plate may be used as a base to support the fabrication of the columns from bottom to top in a modular manner.

A still further feature and advantage of the present column stabilized semi-submersible platforms is that the telescoping keel tank or damping plate may be fully retracted to provide minimum height for the ease of wet transport towing of the platform or placement on the deck of a vessel for dry transport.

Other features and advantages of the invention will become apparent from time to time throughout the specification and claims as hereinafter related.

DESCRIPTION OF THE PREFERRED EMBODIMENTS

Figure 1:
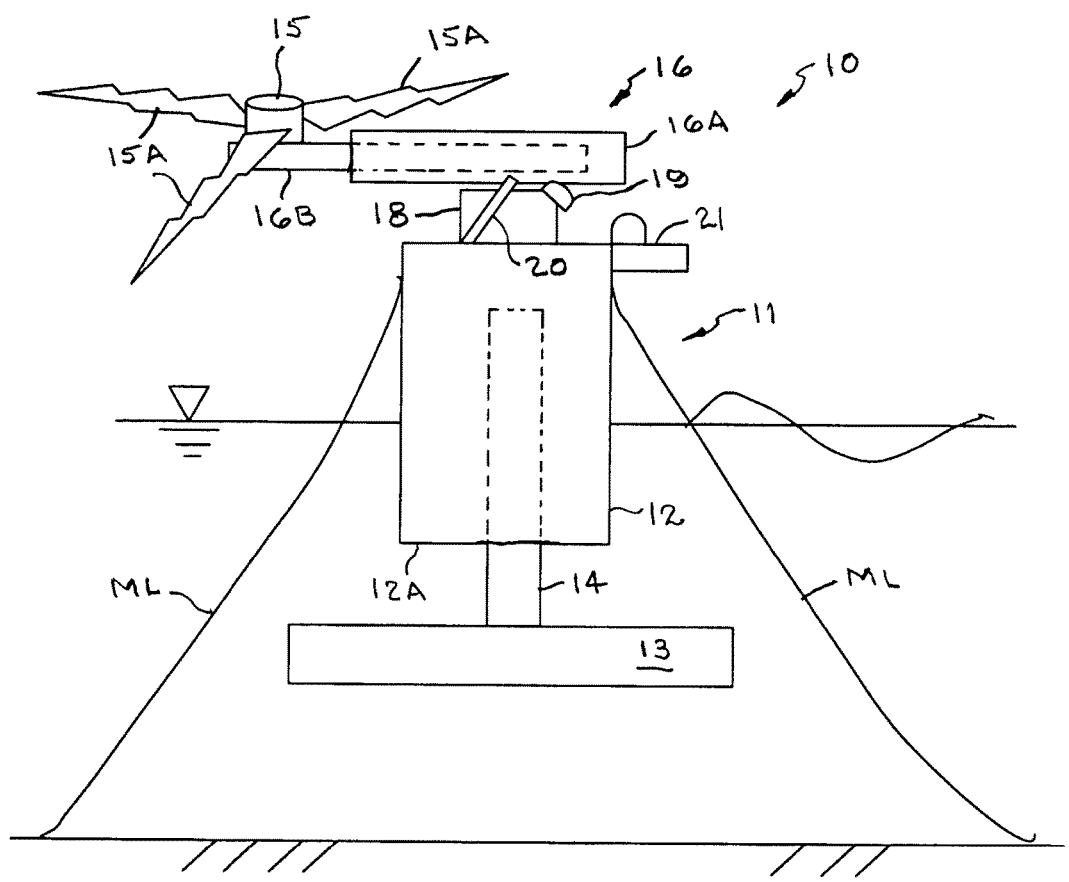
FIGS. 1 and 2 are schematic side elevation views of a mono-column embodiment of the self-installing wind turbine system in accordance with the present invention, showing the tilt and telescoping wind turbine tower assembly in a retracted and horizontal position, and in a vertical extended position, respectively.

The term "column stabilized" as used in the mobile offshore drilling industry refers to a class of mobile offshore drilling units (MODU) wherein the static stability is obtained from the water plane area and the overall center of buoyancy (CB) is allowed to be below the overall center of gravity (CG) of the floating unit with its static loads. When the center of gravity (CG) of the overall platform is situated below the overall center of buoyancy (CB), then positive natural stability is obtained. The term "semi-submersible" as used in the mobile offshore drilling industry refers to a particular type of floating vessel that is supported primarily on large pontoon-like structures submerged below the sea surface and operating decks are elevated perhaps 100 or more feet above the pontoons on large steel columns. The semi-submersible has the advantage of submerging most of the area of components in contact with the sea and minimizing loading from waves and wind. Semi-submersible platforms can operate in a wide range of water depths, including deep water.

In the following detailed description, reference will be made to several embodiments of the invention that are illustrated in the accompanying drawings. Wherever possible, same or similar reference numerals are used in the drawings and the description to identify the same or similar components. The components that have been assigned numerals of reference and shown in earlier drawing figures and described in detail may be shown in subsequent drawing figures and assigned the same numerals of reference but will not be described again in detail in each figure to avoid repetition.

Figure 2:
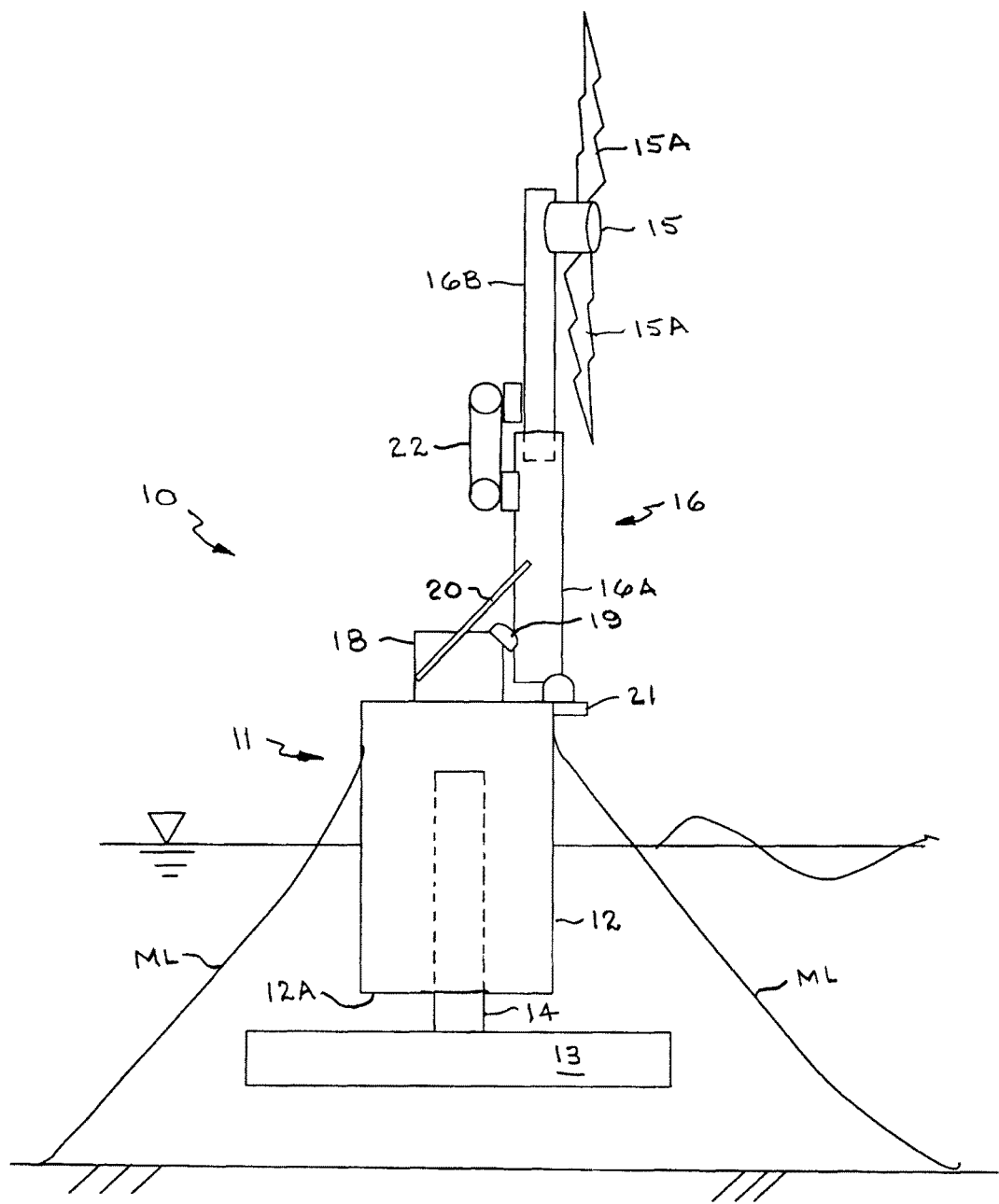

Referring to the drawings by numerals of reference there is shown, somewhat schematically, FIGS. 1 and 2, a preferred mono-column embodiment of a self-installing wind turbine system 10 having a column stabilized semi-submersible platform 11 which includes a vertically oriented large diameter buoyant column 12 with a telescoping keel tank 13. The large diameter vertical buoyant column 12 has a base or bottom wall 12A enclosing its bottom end and defining a central chamber which contains one or more interior buoyant tanks or chambers enclosed by bulkheads, the, buoyancy of which can be selectively adjusted by means of conventional ballast control means. Buoyant columns and ballast control means are conventional in the art and therefore the structural details and components thereof are not shown in detail.

A smaller diameter central cylindrical column may be mounted vertically in the large diameter column. The keel tank 13 has a central elongate vertical spindle 14 extending upwardly from the top end thereof and through the bottom wall 12A of the larger diameter column 12 and is slidably and telescopically mounted within the smaller diameter column within the column 12 and engaged with a raising and lowering mechanism on the base or bottom wall, such as a gear assembly or other conventional raising and lowering means for extensible and retractable movement relative to the larger diameter column 12 of the platform 11.

One or more automatic control systems are provided to telescope the spindle 14 and to lock it at any desired length, and conventional pump control means is provided for selectively pumping water in and out of the keel tank 13 to partially or fully flood the keel tank and thereby adjust the weight and ballast. One or more internal or external locking mechanisms are provided to lock the telescopic spindle 14 and the keel tank 13 at its bottom end with respect to the larger diameter column 12.

The structural details of such a telescoping keel tank arrangement are shown and described in detail in my U.S. Pat. Nos. 6,761,124 and 6,942,427, and which are incorporated herein by reference as if fully set forth in their entirety. By pumping water into or out of the keel tank 13, the collective water mass of the keel tank and thus the weight of the structure, is adjustably tuned to raise or lower the center of gravity (CG) of the entire mass of the floating platform structure according to ballast and other variable or fixed loads.

A wind turbine 15 having a tilt and telescoping tower assembly 16 is mounted at the upper end of the large diameter column 12. The tilt and telescoping tower assembly 16 of the wind turbine 15 has a base or lower section 16A and an upper section 16B. The wind turbine 15 is coupled to the top portion of the end upper section 16B, and a plurality of blades 15A are coupled to the turbine. The turbine 15 generally has a horizontal axis of rotation about which the blades rotate.

A first tower support frame 18 is mounted at the top end of the large diameter column 12 of the platform 11. The base or lower section 16A of the tower assembly 16 is hingedly connected to the support frame 18 at one end thereof by laterally spaced pivot connections 19. A hydraulic cylinder 20 on laterally opposite sides of the tower support frame 18 is pinned at opposed ends between the support frame 18 and the base or lower section 16A of the tower assembly 16 to pivot the tower assembly 16 between a generally horizontal stored or transport position supported on the support frame 18 (FIG. 1) and a generally vertical operating position approximately 90° relative thereto (FIG. 2). A second tower support frame 21 is mounted at the top end of the large diameter column 12 of the platform 11 forwardly of the first tower support frame 18 for receiving and releasably engaging the bottom end of the base or lower section 16A of the tower assembly 16 when the tower assembly is pivoted to the generally vertical operating position.

The upper section 16B of the tower assembly 16 is movably mounted in the base or lower section 16A to telescope and reciprocate relative thereto between a retracted position and an axially extend position relative thereto. As shown in FIG. 2, the upper section 16B of the tower assembly 16 is moved between the retracted and extended positions by a winch with sheaves and a wire line, or block and tackle 22, operably connected between the base or lower section 16A and the upper section 16B of the tower assembly. The tower assembly 16 may be pivoted and extended or retracted simultaneously.

It should be understood from the foregoing that the present wind turbine 15 having a tilt and telescoping tower assembly 16 eliminates necessity of an external crane or derrick to install the wind turbine on site. The tower assembly 16 may be pivoted and telescoped to a compact horizontal position during transport of the platform and to avoid damage during severe weather and storm conditions, or to perform maintenance, or repair or replacement of parts.

The wind turbine 15, including the tilt and telescoping tower assembly 16, may be assembled and mounted on the column 12 of the semi-submersible platform 11 in a sheltered area near the quayside. The whole structure is then towed to an offshore wind-farm or operational location by a tugboat that has anchor handling capability, rather than an expensive crane mounted on offshore construction vessels. The present platforms use less draft than a spar-type platform and can be fully assembled in quayside and towed with the keel tank 13 and the tilt and telescoping tower assembly 16 in a retracted compact position. The keel tank 13 is designed to have adequate buoyancy to support and float the superstructure with its own minimum draft for ease of wet-towing with a cost-effective tug boat. At the operational location, the telescoping keel tank 13 is ballasted to move it downward to the deepwater depth. The additional mass of the water column above the keel tank 13 resists the heave, pitch and roll oscillation of the supporting platform 11 due to wave excitation. During operation, the fully extended keel tank 13 provides the required stability to the horizontal and vertical loads of the wind turbine. The fully extended keel tank 13 is also distanced beneath the severe kinematics of wave particle motion, thereby significantly reducing wave excitation imparted to the supporting floating structure. In addition, the keel tank 13 provides water entrapment above and below the flat surfaces, thereby increasing the hydrodynamic mass and flow damping. These features reduce the heave, pitch and roll motion of the supporting floating structure in the operational mode. Conventional catenary mooring lines ML may be used for the purpose of station keeping of the floating platform.

Figure 3:
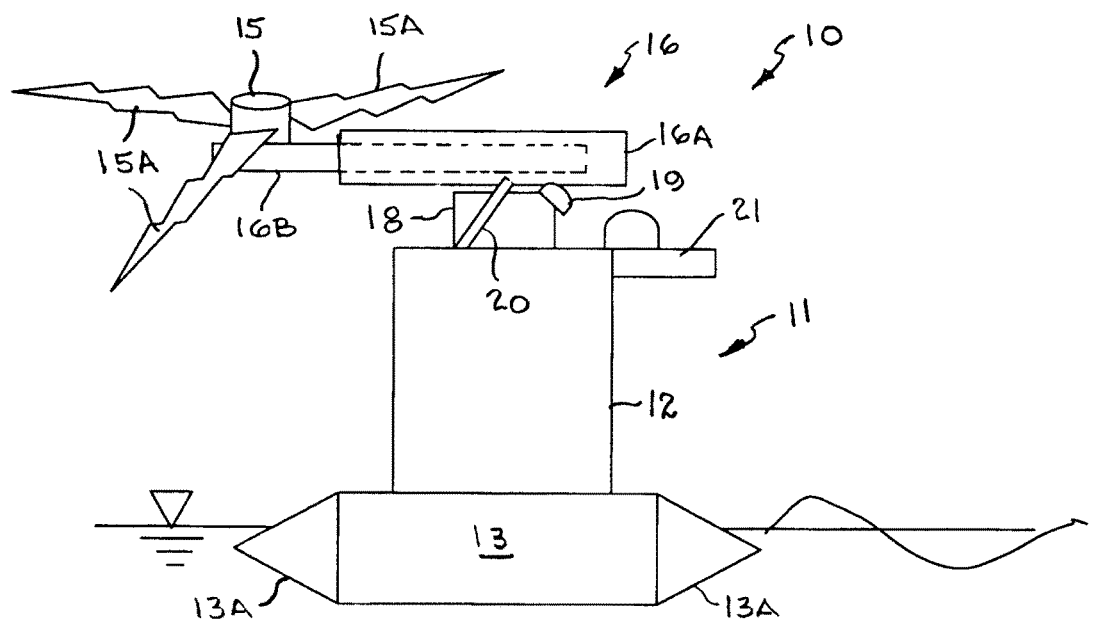
FIG. 3 is a schematic side elevation showing a modification wherein the keel tank is provided with two removable nose cone attachments disposed in diametrically opposed relation to reduce drag during transportation.

Although, for purposes of example, the keel tank 13 has been shown as having a generally cylindrical configuration, it should be understood that the keel tank could be oval-shaped to reduce drag during transportation. FIG. 3 shows a modification wherein the keel tank 13 is provided with two removable nose cone attachments 13A disposed in diametrically opposed relation to reduce drag during transportation.

Figure 4:
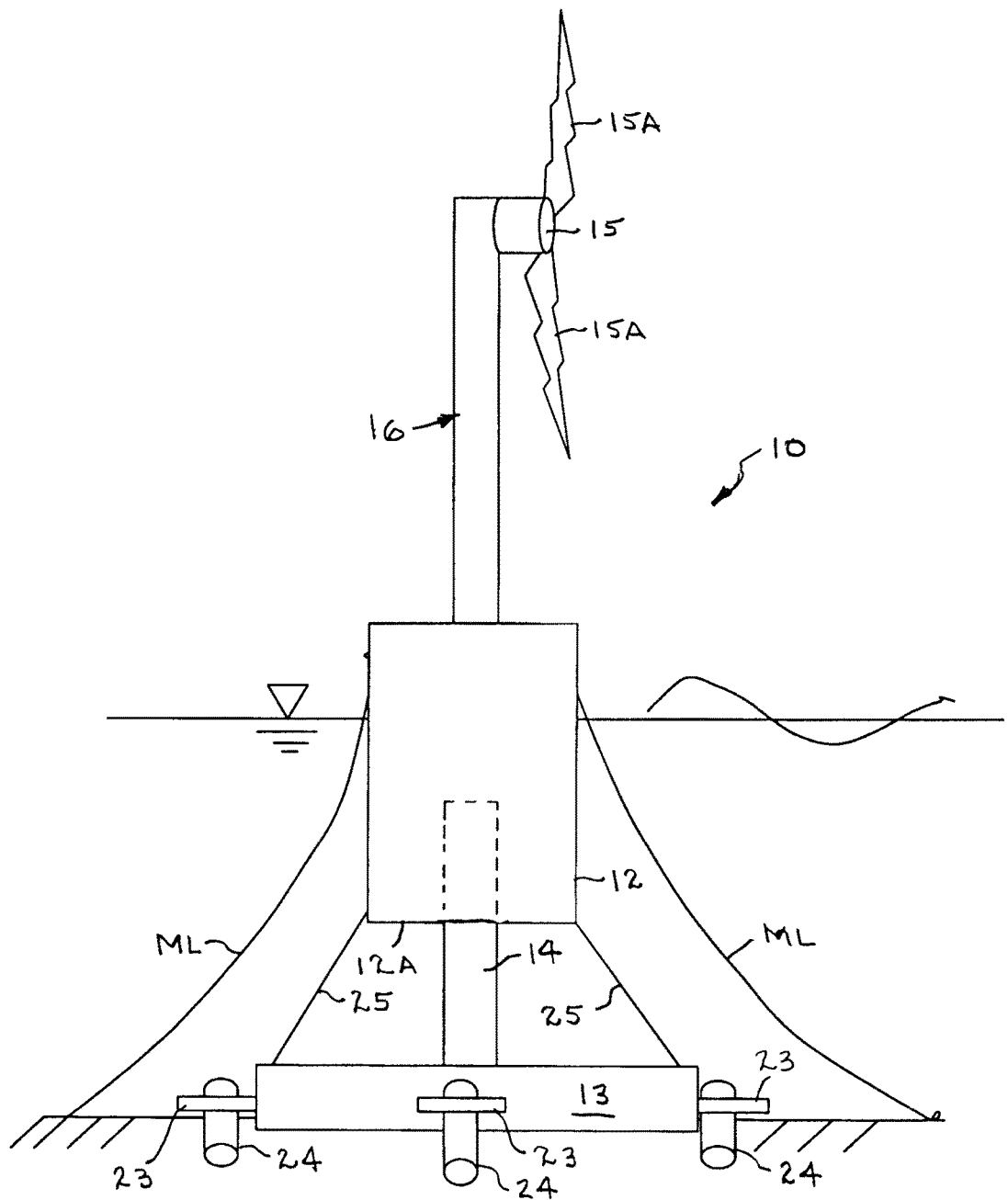
FIG. 4 is a schematic side elevation showing a modification wherein a plurality of pile guides are attached to the periphery of the keel tank which are received on, and connected to, vertical piles of a pile foundation on the seabed and structural brace members extending angularly between the bottom portion of the column and the upper portion of the keel tank.

FIG. 4 shows, somewhat schematically, a modification wherein a plurality of pile guides 23 are attached to the periphery of an elliptical keel tank 13 in spaced apart relation and extend outwardly therefrom which are received on, and connected to, vertical piles 24 of a pile foundation on the seabed. Also shown are a plurality of structural brace members 25 that are attached at opposed ends to the bottom portion of the column 12 and the upper portion of the keel tank 13 to extend angularly therebetween for structural strength.

Figure 5:
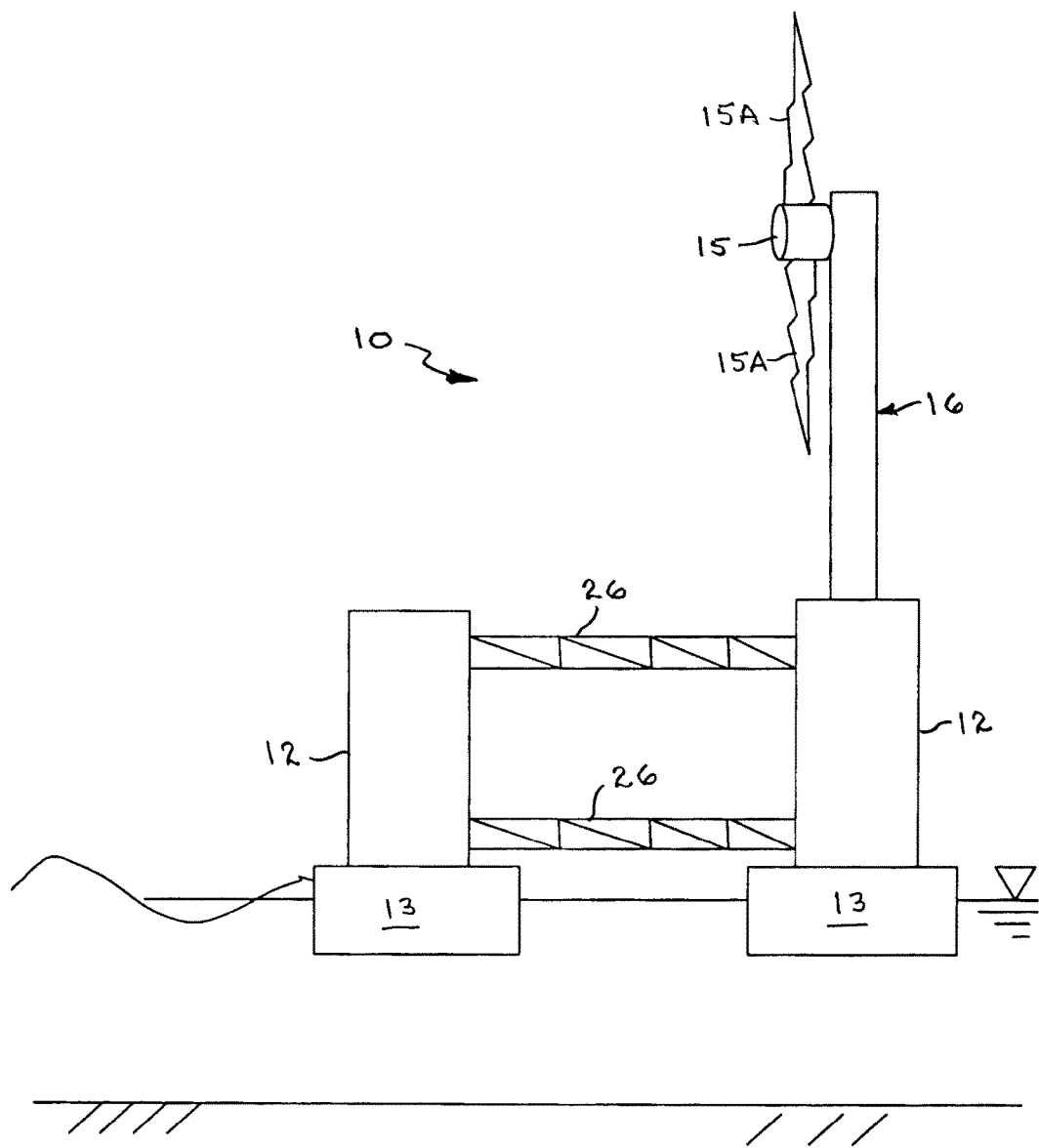
FIG. 5 is a schematic side elevation showing a plurality of the columns of the mono-column wind turbine systems joined together by a plurality of open-frame truss structures.

As shown in FIG. 5, a plurality of the columns 12 of the mono-column wind turbine systems 10 may be joined together by a plurality of open-frame truss structures 26 formed of slender tubular members connected between adjacently spaced columns by welding, bolting, pinning, hinged connections, or other conventional assembly methods. This arrangement allows multiple mono-column wind turbine systems 10 to be joined together such as, for example, to form a wind farm. The components that are the same as previously described above are assigned the same numerals of reference but will not be described again in detail to avoid repetition.

Figure 6:
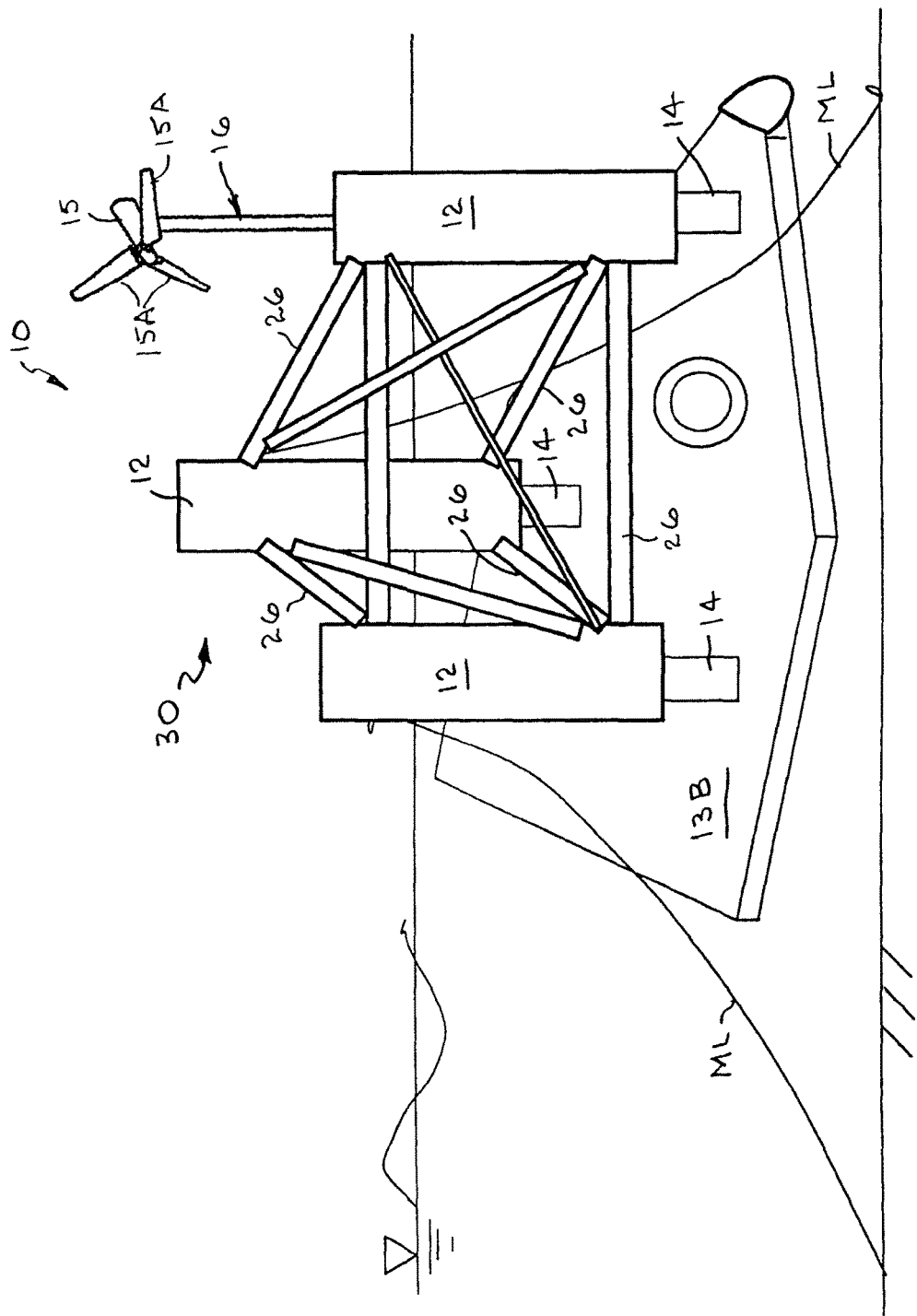
FIG. 6 is a schematic perspective view of a tri-column embodiment of the self-installing wind turbine system in accordance with the present invention wherein three vertically oriented columns are joined together by open frame truss structures to form a generally triangular platform configuration. Also shown is a large single keel tank attached to the vertical spindles.

FIG. 6 shows, somewhat schematically, a tri-column embodiment of the stabilized semi-submersible platform 30 of the self-installing wind turbine system 10 wherein three of the vertically oriented large diameter columns 12 are joined together by a plurality of open frame truss structures 26 formed of slender tubular members connected between adjacently spaced columns to form a generally triangular platform configuration.

FIG. 6 also shows a single telescoping keel tank 13B that has three elongate vertical spindles 14 each extending upwardly from the top end thereof and through the bottom wall of a respective larger diameter column 12 and slidably and telescopically mounted therein and engaged with a raising and lowering mechanism, such as a gear assembly or other conventional raising and lowering means for extensible and retractable movement relative to the larger diameter columns 12 of the platform 30. The bottom end of the vertical telescoping spindles 14 are connected to the top end of the single telescoping keel tank 13B by a swivel connection so as to allow the single telescoping keel tank to pivot relative to a horizontal plane when various ones of the spindles 14 are extended or retracted. The single telescoping keel tank 13B contains interior buoyant tanks or chambers enclosed by bulkheads, the buoyancy of which can be selectively adjusted by means of conventional ballast control means to selectively raise or lower opposite sides or ends of the keel tank and counteract offset loads with respect to the center of the floating platform.

However, it should be understood that each of the vertically oriented large diameter columns 12 of the tri-column embodiment of the stabilized semi-submersible platform 30 may have an individual telescoping keel tank 13, as shown and described previously with respect to the mono-column embodiments.

Figure 7:
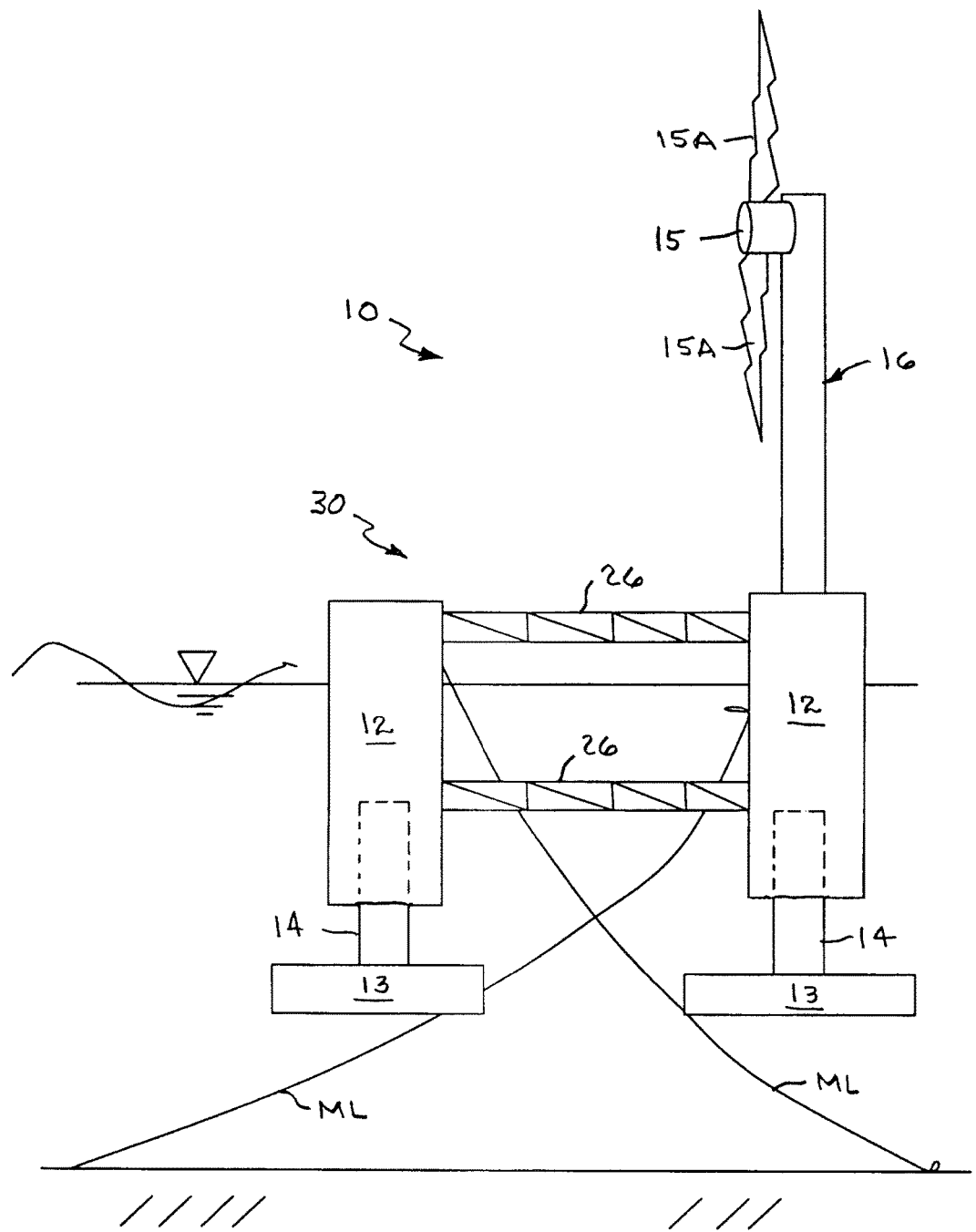
FIG. 7 is a schematic side elevation showing the tri-column embodiment wherein the vertically oriented columns each have a telescoping keel tank.
Figure 8:
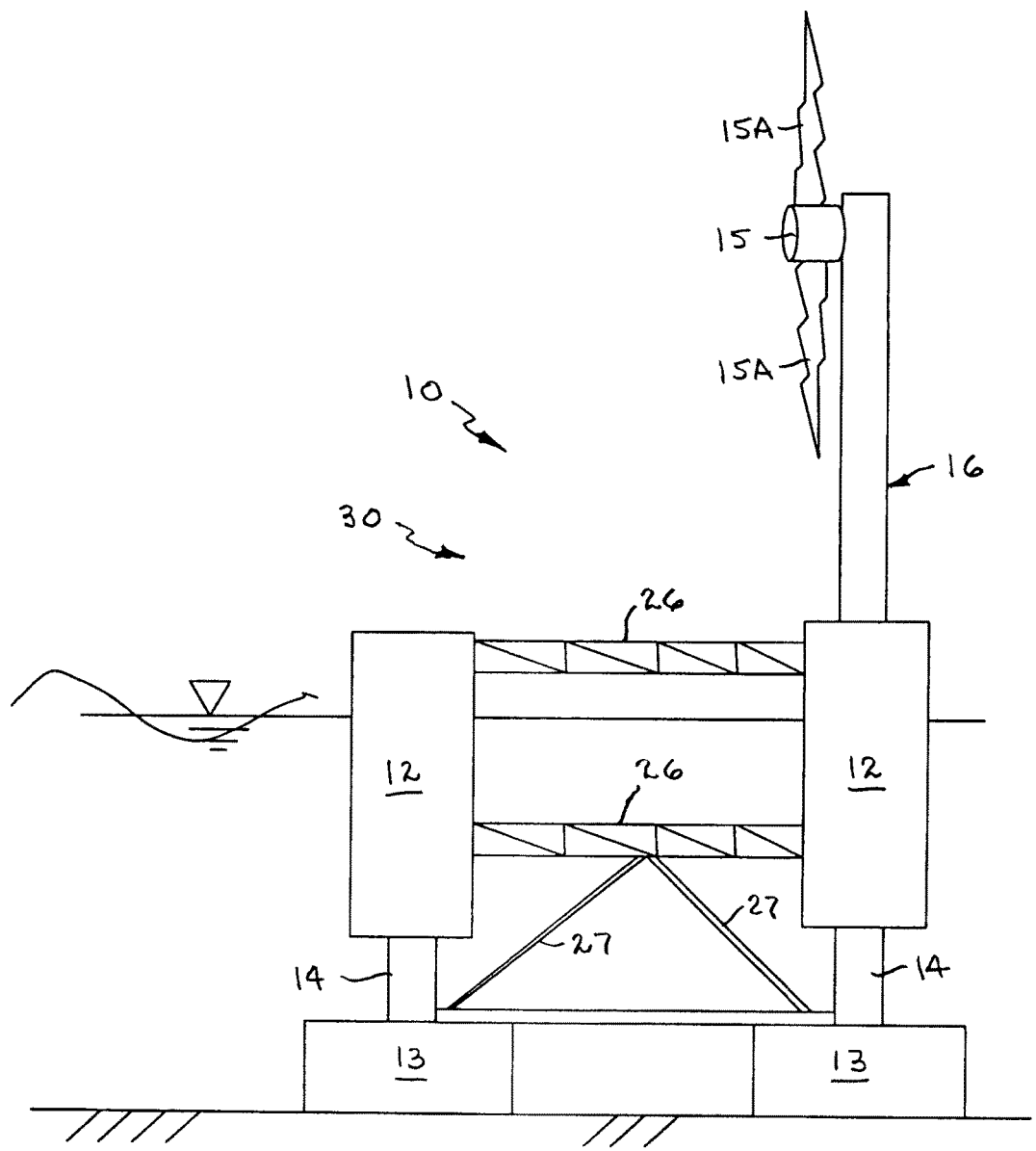
FIG. 8 is a schematic side elevation showing the tri-column embodiment of FIG. 7 with the extended keel tanks on the seabed and structural brace members extending angularly between the truss frame structure and the upper portion of the keel tanks.

FIG. 7 shows, somewhat schematically, a tri-column embodiment of the stabilized semi-submersible platform 30 of the self-installing wind turbine system 10 wherein three of the vertically oriented large diameter columns 12 each have a telescoping keel tank 13 and are joined together by a plurality of open frame truss structures 16 formed of slender tubular members connected between adjacently spaced columns to form a generally triangular platform configuration. FIG. 8 shows the tri-column embodiment of FIG. 7 with the extended keel tanks 13 on the seabed and structural brace members 27 extending angularly between the truss frame structure 26 and the upper portion of the keel tanks 13.

In the examples of the tri-column embodiment of the stabilized semi-submersible platform 30 of the self-installing wind turbine system 10, the wind turbine 15, including the tilt and telescoping tower assembly 16, may be mounted on one of the three columns 12 of the semi-submersible platform. In the vertical extended position, the wind turbine 15 and tilt and telescoping tower assembly 16 extend a distance above the platform, which may create a vertical offset in the static load.

In both, the mono-column platform embodiments 11 and the tri-column platform embodiments 30, static stability is accomplished by the telescoping keel 13, which may be extended to bring the overall center of gravity (CG) down with respect to the free water surface, such that the center of buoyancy (CB) is located a distance below the still water level to provide increased stability to support the wind turbine 15 and the tilt and telescoping tower assembly 16. Thus, the extended keel tank 13 is disposed in the inert water environment during the operational condition. The aerodynamic loads of the wind turbine during peak operations also are managed tactically by the telescoping keel-tank 13. The mooring system of the platform also offers some resistance to the aerodynamic loads in addition to the station keeping function.

In the case of the tri-column embodiments with individual keel tanks, the large offset of the vertical load on one column 12, for example the front column, that supports the wind turbine 15 and tower assembly 16 creates static list to the platform to a certain degree in the in-place condition. The offset load may be counteracted by extending the keel tanks 13 on the sides opposite to the column supporting the wind turbine 15 and tower assembly 16, for example the rear columns 12. The keel tanks 13 on the on the rear side of the platform may be extended or retracted with respect to the keel tank on the front side of the platform to provide the platform with an even keel condition, and to counteract the moment created by the offset turbine offset loads with respect to the center of the floating platform.

In the case of the tri-column embodiments with a single keel tank 13B, the large offset of the vertical load on one column 12, for example the front column, that supports the wind turbine 15 and tower assembly 16 creates static list to the platform to a certain degree in the in-place condition. The offset load may be counteracted by extending the single keel tank 13B on the sides opposite to the column supporting the wind turbine 15 and tower assembly 16, for example the rear columns. The rear portion of the single keel tank 13B on the on the rear side of the platform may be extended or retracted and ballasted with respect to the front portion on the front side of the platform to provide the platform with an even keel condition, and to counteract the moment created by the offset wind turbine loads with respect to the center of the floating platform.

In both, the tri-column embodiments with a single keel tank 13B and tri-column embodiments with individual keel tanks 13, the keel tanks provide water entrapment above and below the flat surfaces, thereby increasing the hydrodynamic mass and flow damping that reduce the heave, pitch and roll motion of the supporting floating structure in the operational mode.

Figure 9:
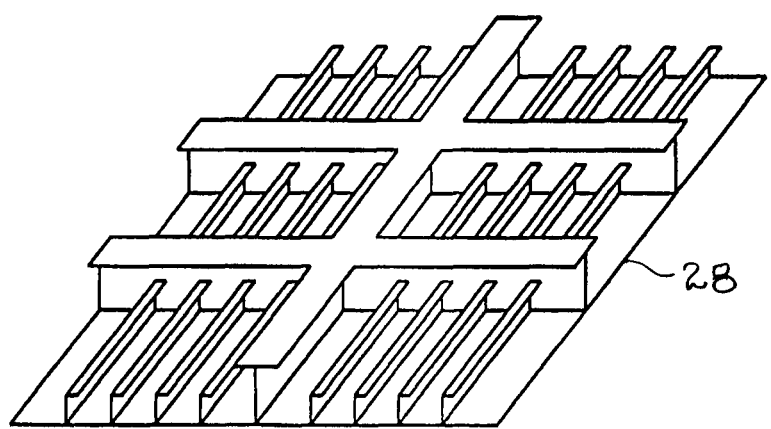
FIG. 9 is a perspective view of a stiffened motion damping plate which may be attached to the bottom of the telescoping spindle that may be utilized as an alternative to the keel tank.

FIG. 9 shows a stiffened motion damper plate 28 which may be attached to the bottom of the telescoping spindle 14 as an alternative to the keel tank to provide motion damping in both, the mono-column embodiments and the tri-column embodiments. The damper plate 28 has a generally flat surface with structural stiffeners. In the illustrated example, the damper plate 28 is shown as having a generally rectangular configuration, however, it should be understood that the damper plate may be of other configurations, such as for example, circular or polygonal.

Figure 10:
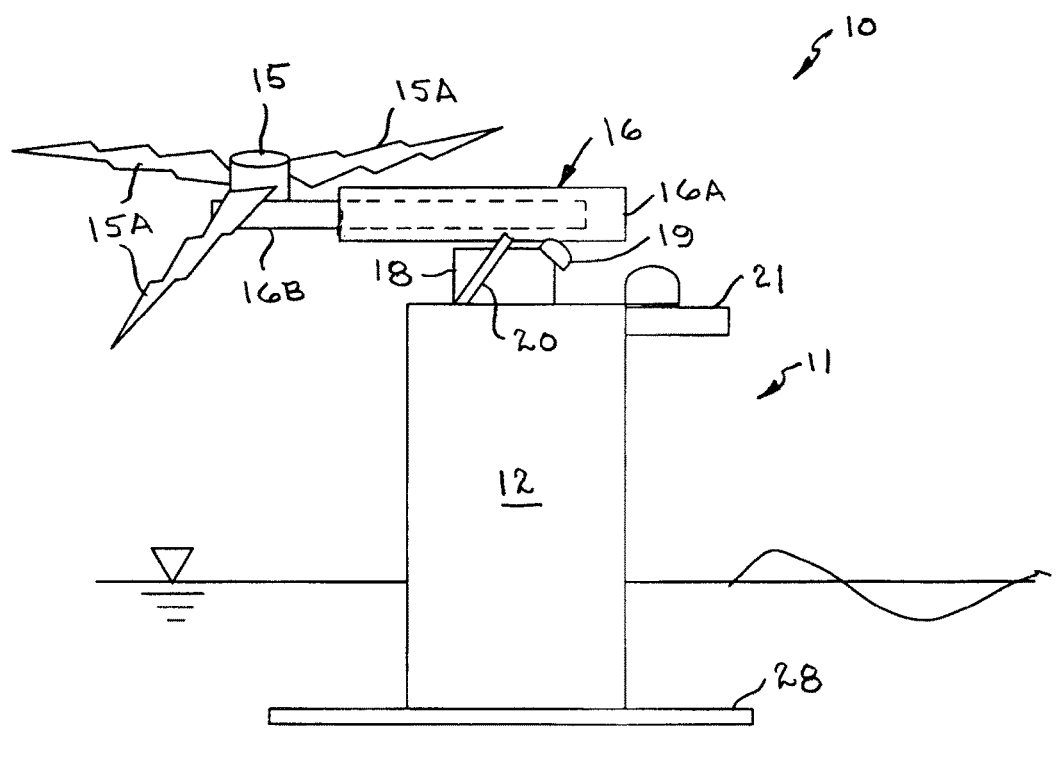
FIG. 10 is a schematic side elevation view of a mono-column embodiment of the self-installing wind turbine system with a stiffened damping plate attached to the spindle of the vertically oriented cylinder and in a retracted position.
Figure 11:
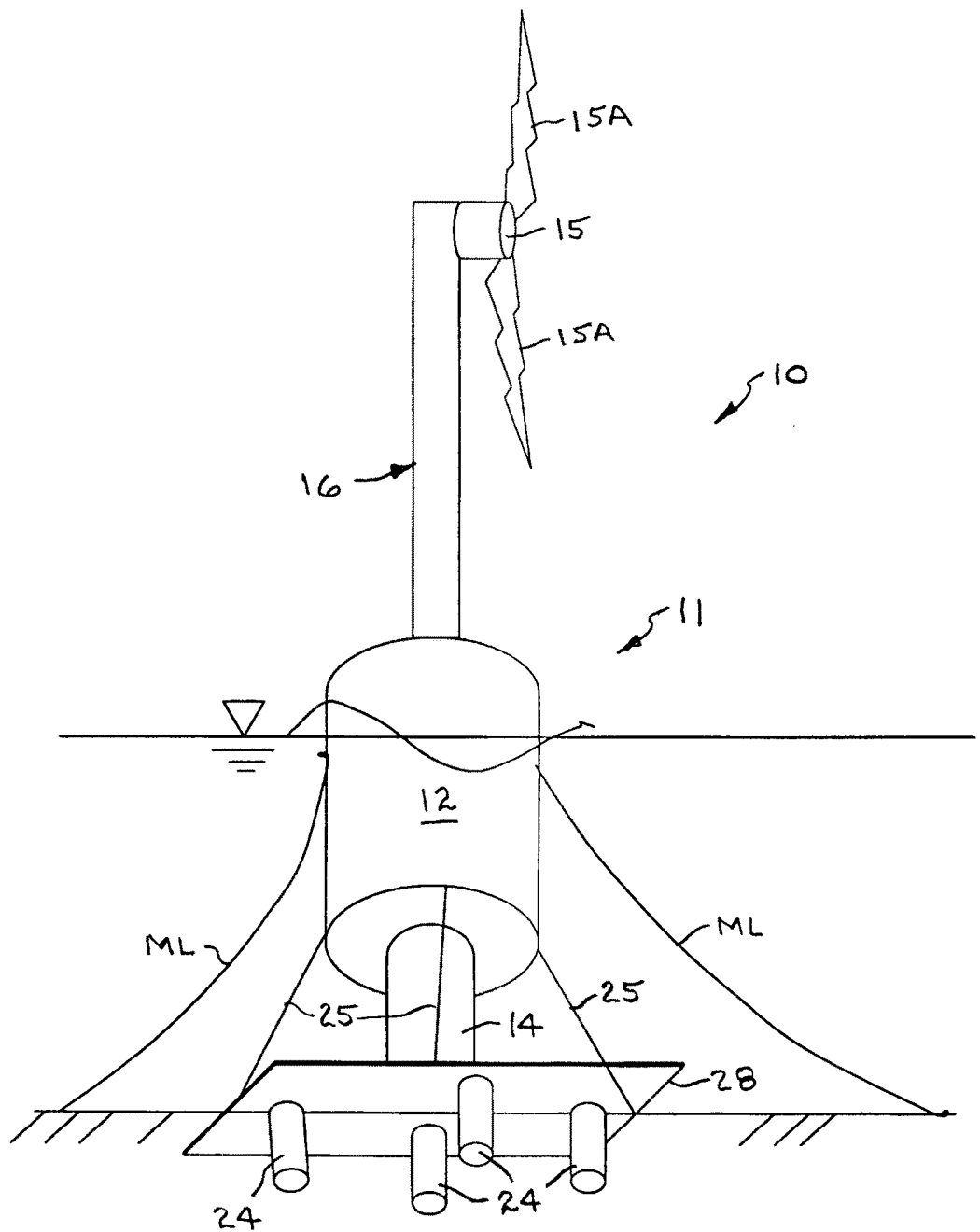
FIG. 11 is a schematic side elevation view of the mono-column embodiment of FIG. 10, showing the stiffened damping plate in an extended position and attached to and connected to vertical piles of a pile foundation on the seabed and structural brace members extending angularly between the bottom portion of the column and the upper portion of the keel tank.
Figure 12:
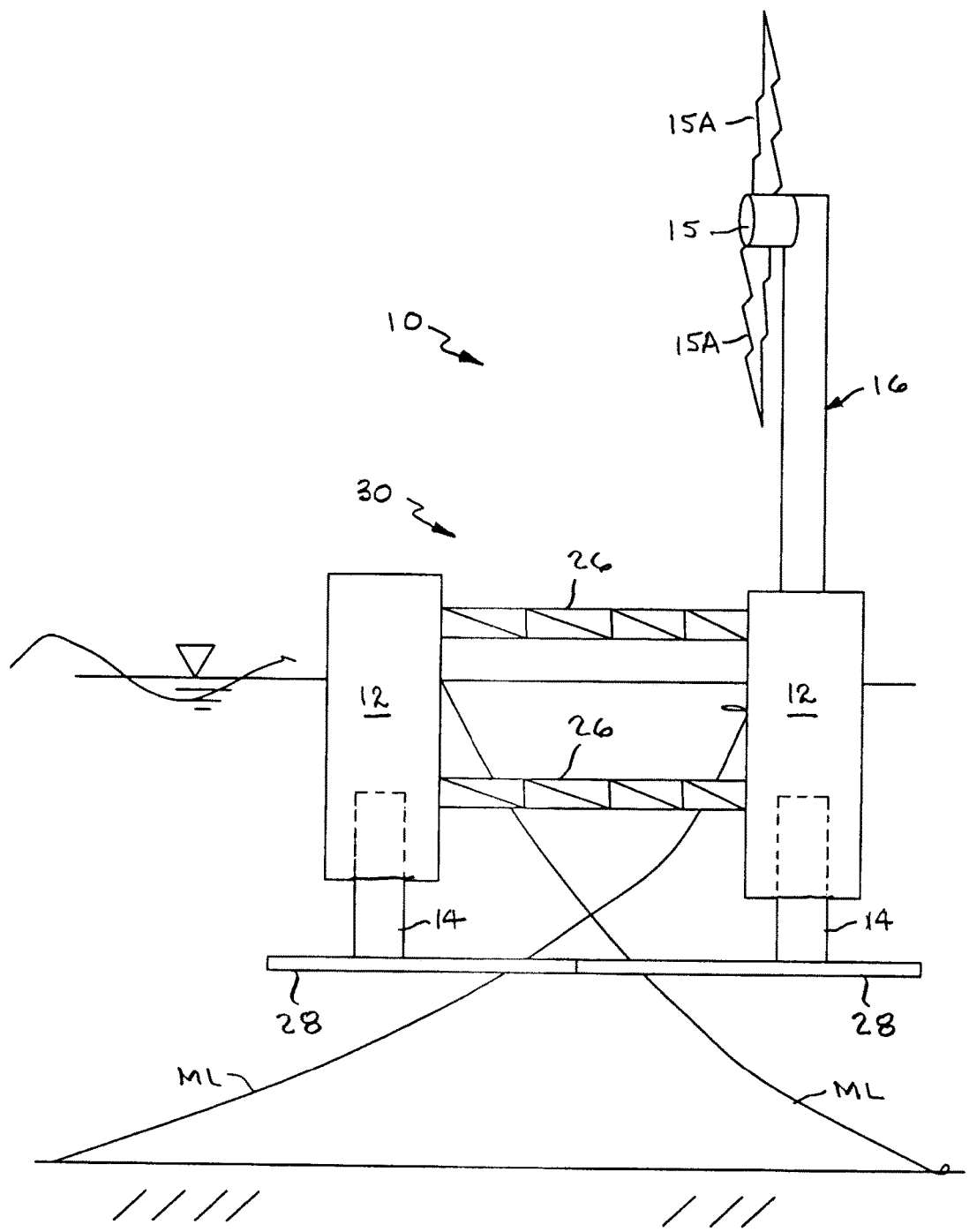
FIG. 12 is a schematic perspective view of a tri-column embodiment of the self-installing wind turbine system wherein each of the vertically oriented columns have a stiffened damping plate attached to the vertical spindles.

FIG. 10 shows a mono-column embodiment of the self-installing wind turbine system with a stiffened damper plate 28 attached to the spindle 14 of the vertically oriented cylinder 12 and in a retracted position. FIG. 11 shows the mono-column embodiment of FIG. 10 with the stiffened damper plate 28 in an extended position and attached to vertical piles 24 of a pile foundation on the seabed and structural brace members 25 extending angularly between the bottom portion of the column 12 and the upper portion of the damper plate 28. FIG. 12 shows a tri-column embodiment of the self-installing wind turbine system wherein each of the vertically oriented columns 12 have a stiffened damper plate 28 attached to the vertical spindle 14.

The stiffened damper plate 28 provides water entrapment above and below the flat surfaces thereof, thereby increasing the hydrodynamic mass and flow damping that reduces the heave, pitch and roll motion of the supporting floating structure in the operational mode and also reduces resistance from water, waves, and current during wet transportation.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A self-installing offshore floating wind turbine system, comprising:
a column stabilized semi-submersible platform having at least one vertically oriented buoyant ballastable column with one or more buoyant tanks or interior chambers enclosed by bulkheads including ballast control means for selectively adjusting the buoyancy thereof;
a telescoping stiffened damper plate having horizontal water entrapment surfaces movably connected with said vertically oriented column by an elongate spindle slidably and telescopically mounted within said vertical column for extensible and retractable movement relative to a lower end thereof;
a tilt and telescoping tower assembly including a first tower support frame mounted at a top end of said vertically oriented column, a lower tower section of said tower assembly hingedly connected at a lower end to said first tower support frame by laterally spaced pivot connections, a hydraulic cylinder on laterally opposed sides of said first tower support frame pinned at opposed ends between said first tower support frame and said lower tower section to pivot said tower assembly between a generally horizontal stored or transport position supported on said first tower support frame and a generally vertical operating position approximately 90° relative thereto, a second tower support frame mounted at a top end of said vertically oriented column spaced a distance from said first tower support frame for receiving and releasably engaging and supporting a bottom end of said lower section of said tower assembly when said tower assembly is pivoted to the generally vertical operating position;
an upper tower section movably mounted in said lower tower section to telescope and reciprocate relative thereto between a retracted position and an axially extended position relative thereto, and extension and retraction means operably connected between said lower tower section and said upper tower section for moving said upper section between the retracted and extended positions; and
a wind turbine coupled to a top portion of said tower upper section, and a plurality of blades coupled to said wind turbine, said wind turbine having a generally horizontal axis of rotation about which said blades rotate; wherein
the relative position and weight of said stiffened damper plate is selectively adjustable to raise or lower the center of gravity of the entire mass of said semi-submersible platform including said wind turbine and said tilt and telescoping tower assembly with respect to the center of buoyancy of said platform according to ballast and variable or fixed loads including loads imposed by said wind turbine and said tilt and telescoping tower assembly in the horizontal and the generally vertical operating positions; and
each said stiffened damper plate, in an extended position, providing water entrapment surfaces to increase hydrodynamic mass and flow damping to reduce heave, pitch and roll motions of said semi-submersible platform in an operational mode.

2. The self-installing offshore floating wind turbine system according to claim 1, wherein
a plurality of said column stabilized semi-submersible platforms are joined together by a plurality of open-frame truss structures formed of slender tubular members connected between adjacently spaced said vertically oriented columns to form a wind farm.

3. The self-installing offshore floating wind turbine system according to claim 1, wherein
said at least one vertically oriented buoyant ballastable column comprises three of said vertically oriented buoyant ballastable columns joined together by a plurality of open-frame truss structures formed of slender tubular members connected between adjacently spaced said vertically oriented columns to form a generally triangular platform configuration; wherein
respective said columns each have a said telescoping stiffened damper plate movably connected therewith by an elongate spindle slidably and telescopically mounted within said respective column for extensible and retractable movement relative to a lower end thereof;
said tilt and telescoping wind turbine tower assembly lower section is pivotally coupled to an upper end of one of said vertically oriented columns;
the relative position and weight of each said stiffened damper plate is selectively adjustable to raise or lower the center of gravity of the entire mass of said semi-submersible platform including said wind turbine and said tilt and telescoping tower assembly with respect to the center of buoyancy of said platform according to variable or fixed loads including loads imposed by said wind turbine and said tilt and telescoping tower assembly in the horizontal and the generally vertical operating positions; and each said stiffened damper plate, in an extended position, providing water entrapment surfaces to increase hydrodynamic mass and flow damping to reduce heave, pitch and roll motions of said semi-submersible platform in an operational mode.

4. The self-installing offshore floating wind turbine system according to claim 1, wherein said at least one vertically oriented buoyant ballastable column comprises three of said vertically oriented buoyant ballastable columns joined together by a plurality of open-frame truss structures formed of slender tubular members connected between adjacently spaced said vertically oriented columns to form a generally triangular platform configuration;

said tilt and telescoping wind turbine tower assembly lower section is pivotally coupled to an upper end of one of said vertically oriented columns;

respective said columns each have an elongate spindle slidably and telescopically mounted within said respective column for extensible and retractable movement relative to a lower end thereof:

said stiffened damper plate is a single large stiffened damper plate movably connected at a lower end of each said elongate spindle by a swivel connection near the outer periphery thereof so as to allow said single large damper plate to pivot relative to a horizontal plane when various ones of said spindles are extended or retracted; wherein the relative position and weight of said single large stiffened damper plate is selectively adjustable to raise or lower the center of gravity of the entire mass of said semi-submersible platform including said wind turbine and said tilt and telescoping tower assembly with respect to the center of buoyancy of said platform according to ballast and variable or fixed loads including loads imposed by said wind turbine and said tilt and telescoping tower assembly in the horizontal and the generally vertical operating positions;

the relative position and weight of said single large stiffened damper plate is selectively adjustable to raise or lower front, rear, or side portions, of said single large stiffened damper plate on sides or ends opposite to said one column supporting said wind turbine, and to provide said platform with an even keel condition, and to counteract listing and moment forces created by offset wind turbine loads with respect to the center of buoyancy of said platform; and said single large stiffened damper plate, in an extended position, providing water entrapment surfaces to increase hydrodynamic mass and flow damping to reduce heave, pitch and roll motions of said semi-submersible platform in an operational mode.

5. The self-installing offshore floating wind turbine system according to claim 1, wherein said telescoping stiffened damper plate is extensible and retractable in a floating transport mode, and is anchored to the seabed in the extended position at a location of operation.

6. The self-installing offshore floating wind turbine system according to claim 5, wherein said telescoping stiffened damper plate in the extended position, is anchored to a pile foundation on the seabed at the location of operation.

* * * * *